United States Patent [19]

Haren

[11] 4,195,570

[45] Apr. 1, 1980

[54] NON-MISTING INKING ROLL, METHOD OF MAKING SAME, AND INK FOR USE THEREWITH

[75] Inventor: Doyle V. Haren, Clyde, N.C.

[73] Assignee: Dayco Corporation, Dayton, Ohio

[21] Appl. No.: 690,334

[22] Filed: May 26, 1976

[51] Int. Cl.[2] .......................... B41F 1/46; B29D 27/00

[52] U.S. Cl. .................................... 101/348; 101/327; 264/49; 264/129

[58] Field of Search .......... 264/49, DIG. 18, DIG. 5, 264/129; 427/388; 101/327, 335, 348; 215/15 R

[56] References Cited

U.S. PATENT DOCUMENTS

| | | | |
|---|---|---|---|
| 2,715,587 | 8/1955 | Armitage et al. | 427/388 D X |
| 2,946,702 | 7/1960 | Bach | 427/388 D X |
| 3,131,081 | 4/1964 | Husum | 427/388 D X |
| 3,253,542 | 5/1966 | McDonough | 101/327 X |
| 3,821,059 | 6/1974 | Hensel | 264/DIG. 18 |
| 3,928,521 | 12/1975 | Haren et al. | 264/DIG. 5 |
| 3,937,854 | 2/1976 | Shank | 215/12 R X |

FOREIGN PATENT DOCUMENTS

| | | | |
|---|---|---|---|
| 961694 | 6/1964 | United Kingdom | 427/388 D |

*Primary Examiner*—Philip E. Anderson
*Attorney, Agent, or Firm*—Reuben Wolk

[57] ABSTRACT

A substantially non-misting inking roll having a plurality of interconnecting microporous cavities which have disposed therein an ink formulation containing a plastisol resin as a thickening substance. The roll is formed by shaping an elastomeric material containing a leachable hydrated soluble salt therein into a sleeve about a cylindrical support, curing the elastomer, leaching out the salt to form the interconnecting micropores and disposing in the micropores an ink formulation containing a plastisol resin as a thickening substance in the micropores of the sleeve.

13 Claims, 5 Drawing Figures

NON-MISTING INKING ROLL, METHOD OF MAKING SAME, AND INK FOR USE THEREWITH

BACKGROUND OF THE INVENTION

Microporous ink-loaded rolls, referred to as inking rolls, are used in the printing industry to transfer ink to a printing wheel or to a transfer roll which in turn transfers ink to a printing wheel.

The presently available inking rolls are deficient because they tend to "mist" or expel fine sprays of ink from their rotating inking surfaces at comparatively high speeds generally of the order of 1,000 feet per minute and greater. These presently available rolls also tend to mist at elevated temperatures and when the elevated temperature is coupled with speeds of the character mentioned, the misting problem is aggravated.

SUMMARY

It is a feature of this invention to provide an improved non-misting inking roll.

Another feature of this invention is to provide an inking roll of the character mentioned comprised of a microporous elastomeric material.

Another feature of this invention is to provide an inking roll of the character mentioned which may be used at high rotational speeds, elevated temperatures, or both.

Another feature of this invention is to provide a non-misting inking roll having integral means which serves to control the flow of ink exuding therefrom as a function of ambient and roll temperature.

Another feature of this invention is to provide a non-misting inking roll which has an improved ink formulation of optimum tackiness dispersed therethrough.

Another feature of this invention is to provide an improved method of making a non-misting inking roll.

Another feature of this invention is to provide an improved ink formulation particularly adapted to cooperate with a microporous elastomeric material.

Accordingly, it is an object of this invention to provide an improved inking roll, method of making same, and ink formulation having one or more of the features set forth above or hereinafter shown or described.

Other objects, features, details, uses, and advantages of this invention will become apparent from the embodiments thereof presented in the following specification, claims, and drawing.

BRIEF DESCRIPTION OF THE DRAWING

The accompanying drawing shows present preferred embodiments of this invention, in which.

DETAILED DESCRIPTION

Figure 1:
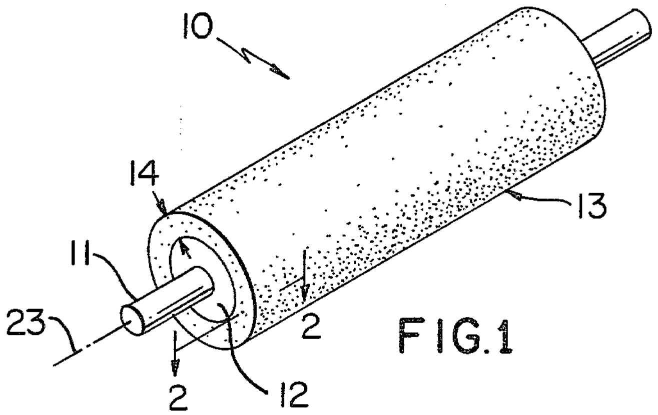
FIG. 1 is a perspective view illustrating one exemplary embodiment of the inking roll of this invention comprised of a central shaft, a tubular support detachably fixed around the shaft, and a sleeve member made of a microporous elastomeric material supported on the support.

Reference is now made to FIG. 1 of the drawing which illlustrates an exemplary embodiment of a non-misting inking roll of this invention which is designated generally by the reference numeral 10, and such roll 10 has a central shaft 11 which in this example is provided with a cylindrical supporting member 12 which is removably supported concentrically around the shaft 11. The member 12 supports a microporous tubular sleeve 13 concentrically therearound and such sleeve has a comparatively large radial thickness as indicated at 14.

Figure 2:
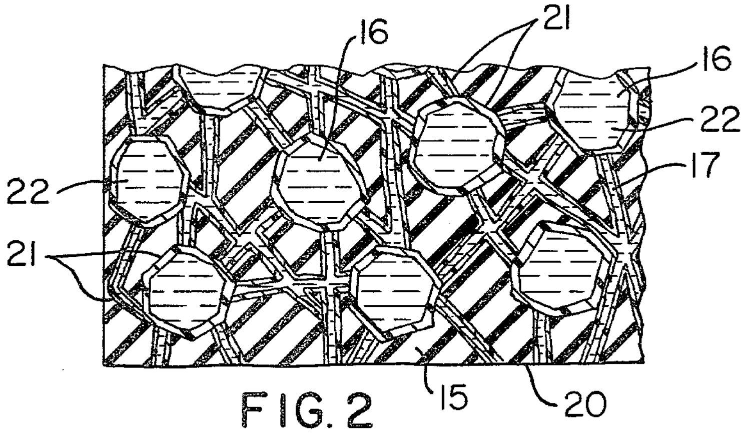
FIG. 2 is a greatly enlarged fragmentary cross-sectional view taken essentially on the line 2—2 of FIG. 1 and particularly illustrating a plurality of outer cavities and interconnecting passages in the microporous elastomeric material of the sleeve member of FIG. 1 showing such cavities and passages lined with a thermally expandable and contractable plastic material and filled with an ink formulation of this invention.

The tubular sleeve 13 is made of a suitable elastomeric microporous matrix material which as shown in FIG. 2 is designated by the reference numeral 15; and, such matrix material 15 is shown as a rubber material which has a plurality of ink-receiving cavities 16 disposed throughout and integral passages 17 interconnecting the cavities with the sleeve 13 having an outer ink-applying surface 20. The cavities 16 are basically of different sizes within a controlled size range; and, the integral passages or channels 17 are also of different sizes, though comparatively smaller than the sizes of the cavities 16.

The integral cavities 16 and passages 17 are formed in an elastomeric matrix to define a microporous stock from which the sleeve 13 is made utilizing any suitable technique known in the art. Preferably such passages and cavities are defined by admixing sized particles of a suitable hydrated material such as hydrated magnesium sulfate, for example, with an elastomeric matrix material, such as a rubber compound, in a mixing device such as a Banbury Mill to define a rubber matrix material loaded with sized particles of hydrated magnesium sulfate. The rubber matrix material with its sized particles of hydrated magnesium sulfate is then cured and leached and further processed according to techniques known in the art and as described more fully in U.S. Pat. No. 3,928,521, for example, to thereby define a suitable microporous stock material (not shown) and the sleeve member with its cavities 16 and passages 17. The microporous sleeve member 13 is then installed on the supporting member 12 and shaft 11 and this may be achieved using any suitable technique known in the art.

Figure 3:
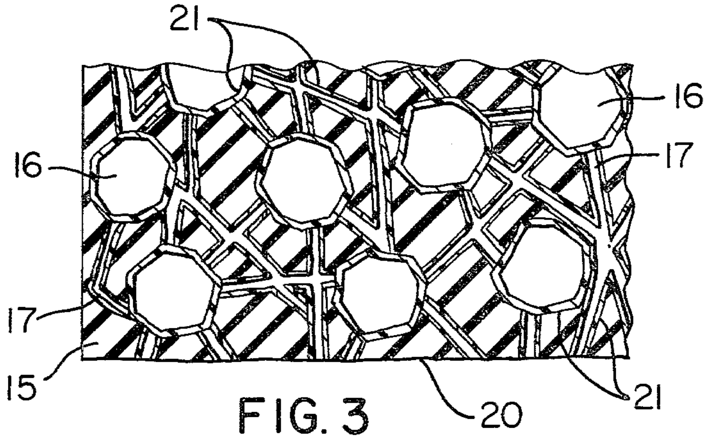
FIG. 3 is a view similar to FIG. 2 minus the ink formulation to highlight the lining of the thermally expandable and contractible plastic material in the outer cavities and interconnecting passages.

As will be readily apparent from FIGS. 2 and 3 of the drawing, the sleeve 13 has a layer or coating 21 of a thermally responsive snythetic plastic material on the cavities 16 and passages 17 and the coating 21 is made of a thickening agent, to be subsequently described which is added to commercially available printing ink basically without regard to ink color to define a modified thixotropic ink formulation 22. The thermally responsive layer or coating 21 serves as an automatic flow restrictor controlling the flow of ink formulation 22 from the ink applying surface 20 by reducing the flow area of the passages 17 in direct proportion to an increase in temperature and thereby substantially eliminating misting of the inking roll 10 due to temperature of the roll 10, ink formulation, and ambient temperature.

The coating 21 on the cavities 16 and 17 is provided in dimenishing thickness, in a manner to be described in detail subsequently, from the outside ink-applying surface 20 toward the central longitudinal axis 23 of the roll; however, for ease of drawing the coating 21 on each cavity 16 and passage 17 is shown as having the same thickness. The thickness of the coating 21 on each passage 17 is such that the effective flow area through each passage 17 is reduced a substantial amount approaching 50% of the original flow area.

The sleeve 13 of the inking roll 10 is filled with the ink formulation 22 after installing the cylindrical sleeve support 12 around the shaft 11 and fixing the sleeve 13 on the support 12.

A suitable thickening agent is provided which in this example is in the form of a plastisol, to be defined in more detail later, and such thickening agent is dispersed throughout the printing ink to define the modified ink formulation 22, see FIG. 2, which is basically a thixotropic formulation. The thickening agent or plastisol may be added to commercially available printing ink of any desired color.

Figure 5:
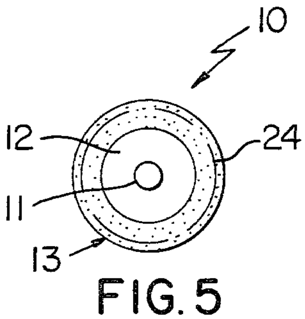
FIG. 5 is an end view of the roll of FIG. 1 roughly illustrating with dot-dash lines arranged in a circular pattern the extent to which part of the plastic material in the ink formation coats the outer peripheral portion of the ink roll.
Figure 4:
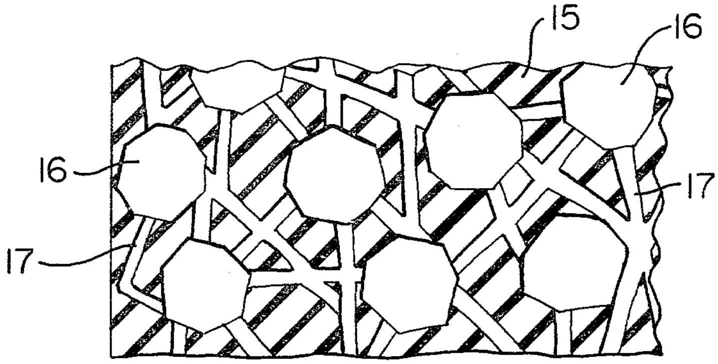
FIG. 4 is a view similar to FIG. 2 particularly illustrating the microporous elastomeric material of the sleeve member minus both the ink formulation and plastic lining in the outer cavities and interconnecting passages.

The ink formulation 22 containing plastisol is provided in the sleeve 13 of roll 10 by employing a differential pressure technique. Preferably, the entire roll 10 is disposed in a sealed chamber which is at one pressure whereupon ink formulation 22 at a greater pressure is introduced around and against the outside surface 20 of the roll 10. For example, the roll 10 may be disposed in a vacuum chamber and the air evacuated therefrom, whereupon ink formulation 22 containing plastisol is then introduced around the ink applying surface 20 by flowing such ink formulation such that it surrounds the sleeve member 13 submerging same whereby ink formulation flows radially inwardly toward the center of the roll to a thickness indicated roughly by a circular dot-dash line 24 in FIG. 5. As the ink formulation 22 reverse flows inwardly into the sleeve 13 such sleeve acts as a filter and some of the plastisol in the ink formulation coats and lines the cavities 16 and passages 17 to define the previously described coating 21 which decreases in thickness as the distance into the sleeve 13 or roll 10 from surface 20 increases.

The amount of thickening agent or plastisol which may be added in a printing ink may vary within controlled limits. Preferably the amount of plastisol is generally between 20 parts by weight plastisol to 80 parts by weight or ordinary ink to 5 parts by weight of plastisol to 95 parts by weight of ink whereby it will be seen that the amount of plastisol to 100 parts of mixture or ink formulation 22 ranges between 5 and 20 parts.

In some applications of this invention it may be desired to further modify the ink formulation after adding plastisol to reduce its kinematic viscosity yet provide a substantial amount of plastisol; and, this may be achieved by adding a reducing oil. Thus, the modified ink formulation 22 in the roll 10 may be with or without reducing oil. The amount of reducing oil may vary between 5 to 75 parts by weight of reducing oil for each 100 parts by weight of modified ink formulation 22 containing ordinary ink, plastisol, and reducing oil.

The coating 21 of plastisol on the cavities 16 and passages 17 particularly the outer cavities and passages serves as a thermally responsive automatic flow restrictor which controls the flow of ink formulation exuding from the ink applying surface 20. This control is achieved because as the temperature of the coating 21 increases, for example, it expands and reduces the flow area of passages 17. As the temperature of the coating decreases it contracts providing more flow area through the passages 17. This action of the coating assures that misting does not take place at elevated temperature.

The use of plastisol as a thickening agent serves the dual purpose of increasing the kinematic viscosity of the ink as well as increasing the tackiness of such ink.

The plastisol is added to define the ink formulation which has the unique properties of improved tackiness and the above described thermal features for the coating 21. The reducing oil is added so that the formulation has the approximate viscosity of the original ink without thickening agent or plastisol yet has a substantial amount of plastisol therein. This is achieved to provide basically the same flow characteristics in the ink formulation as in printing ink without plastisol.

As an example of the amount of plastisol which may be added to an ordinary commercially available printing ink the following would be typical. A standard printing ink may have a kinematic viscosity of 2500 centipoise. A sufficient amount of plastisol may be added to such ink to increase its kinematic viscosity to as high as approximately twice its viscosity, i.e., to 5000 centipoise. The ink as modified with plastisol may then be further modified with reducing oil to reduce its viscosity to its original value of roughly 2500.

Any suitable plastisol may be used to make the ink formulation 22. Preferably plastisol is in the form of vinyl plastisol resin, dioctyl azelate and/or dioctyl phthalate.

It will also be appreciated that any suitable reducing oil may be used. In one application of this invention a reducing oil was used which is manufactured by the Magie Brothers Oil Company, 9100 Fullerton Avenue, Franklin Park, Ill. 60131, and sold under the trade designation of No. 520 Reducing Oil.

After providing the modified ink formulation 22 of this invention with or without reducing oil it may be desired to further thicken or increase the viscosity of such ink formulation. This may be achieved in a precise manner by wiping excess ink formulation from the outside surface 20 of the ink-loaded roll 10 and placing such roll in a heated environment at a temperature ranging between 220° and 300° F. for a time period ranging between 5 minutes and 30 minutes. This additional heating is provided in instances where additional setting properties are required for the ink formulation. Although the temperature range for heating the ink-loaded roll has been given as ranging between 220° and 300° F., in most applications the heating is achieved at about 225° F. with the increased temperature of 300° F. being used when an exceptionally "dry" roll is desired.

Having described the roll 10 of this invention and method of making the same, an example will now be presented in Table I of a typical ink formulation 22 which has been used in roll 10 without reducing oil; and, this table lists each ingredient in the formulation and its amount by weight.

TABLE I

| Ingredient | Amount |
|---|---|
| Oleic Acid | 40 |

TABLE I-continued

| Ingredient | Amount |
|---|---|
| Tall Oil | 17 |
| Ester Gum | 10 |
| Methyl Violet Base | 23 |
| Dioctyl Azelate | 2 |
| Dioctyl Phthalate | 3 |
| Vinyl Resin | 5 |
| Total Weight | 100 Units |

In the above Table I vinyl resin, dioctyl azelate and dioctyl phthalate are combined to define the plastisol in the ink formulation 22 and comprise 10% of the total weight of the formulation; however, it will be appreciated that any suitable plastisol may be used and may comprise between 5 and 20% by weight of the formulation as previously mentioned. Further, although Table I does not show a reducing oil in the ink formulation 22 such reducing oil may be added, as desired, to precisely control the kinematic viscosity thereof.

The inking roll of this invention is effective in reducing misting at elevated temperatures and what is meant by this are temperatures generally of the order of 150° F. and greater.

While present exemplary embodiments of this invention, and methods of practicing the same, have been illustrated and described, it will be recognized that this invention may be otherwise variously embodied and practiced within the scope of the following claims.

What is claimed is:

1. A substantially non-misting inking roll comprising, cylindrical support means, a microporous cylindrical member supported by said support means, said member being defined by an elastomeric material having a plurality of ink-receiving cavities dispersed throughout and integral passages interconnecting said cavities, said member having an outer ink-applying surface, an ink formulation disposed in said cavities and passages, said ink formulation comprising a printing ink having a thickening substance in the form of a plastisol dispersed therethrough to define a modified ink formulation, said thickening substance ranging between 5 parts to 20 parts by weight of said ink formulation, and a solidified coating of some of said thickening substance on the outer ones of said cavities and passages, said coating being thermally responsive and said coating on said outer passages serving as an automatic flow restrictor controlling flow of said ink formulation from said ink-applying surface by reducing flow area of said passages in direct proportion to an increase in temperature and thereby substantially eliminating misting of said roll due to temperature.

2. A method of providing a substantially non-misting inking roll having a central longitudinal axis, said method comprising the steps of, providing cylindrical support means, forming a microporous tubular sleeve defined by an elastomeric material having a plurality of ink receiving cavities dispersed throughout and integral passages interconnecting said cavities, said sleeve having an outer ink-applying surface, mixing a thickening substance with a printing ink to define a modified ink formulation, installing said sleeve on said support means, and reverse flowing said ink formulation through said ink-applying surface toward said axis, said reverse flowing providing a thermally responsive coating of some of said thickening substance on the outer ones of said cavities and passages, said coating on said outer passages serving as an automatic flow restrictor controlling flow of said ink formulation from said ink-applying surface by reducing flow area of said passages in direct proportion to an increase in temperature and thereby substantially eliminating misting of said roll due to temperature, said mixing step comprising mixing a thickening substance in the form of a plastisol which increases the kinematic viscosity of said ink formulation sufficiently to substantially reduce misting of said roll even during comparatively high speed rotation thereof.

3. A method as set forth in claim 1 in which said mixing step comprises mixing said thickening substance to increase the kinematic viscosity of said ink formulation to as high as approximately twice its kinematic viscosity prior to mixing said substance.

4. A method as set forth in claim 1 in which said mixing step comprises forming said plastisol by mixing vinyl resin, dioctyl azelate, and dioctyl phthalate.

5. A method as set forth in claim 1 in which said reverse flowing step causes said passages to be reduced in volume to a value approaching roughly 50% of their original volume.

6. A method as set forth in claim 1 in which said step of forming a microporous roll comprises forming an elastomeric roll by leaching hydrated soluble salts dispersed within an elastomeric matrix.

7. A method as set forth in claim 1 and further comprising adding a reducing oil to said ink formulation during said mixing step to precisely control the viscosity of said ink formulation.

8. A method as set forth in claim 1 in which said mixing step comprises mixing said thickening substance to increase the kinematic viscosity to as high as approximately twice the kinematic viscosity of the original printing ink comprising the ink formulation and then mixing a reducing oil in the ink formulation of increased viscosity to reduce the kinematic viscosity to a value approximately equal the kinematic viscosity of the original printing ink to thereby produce an ink formulation having a maximum plastisol therein.

9. A method as set forth in claim 1 and comprising the further step of subjecting said roll with said modified ink formulation disposed in its sleeve to an elevated temperature to further increase the kinematic viscosity of the ink formulation.

10. A method as set forth in claim 10 in which said subjecting step comprises subjecting said roll with said modified ink formulation disposed therein to a temperature ranging between 220° F. and 300° F. for a time ranging between 5 minutes and 30 minutes.

11. A method of providing a substantially non-misting inking roll having a central longitudinal axis, said method comprising the steps of, providing cylindrical support means, forming a microporous tubular sleeve defined by an elastomeric material having a plurality of ink-receiving cavities dispersed throughout and integral passages interconnecting said cavities, said sleeve having an outer ink-applying surface, mixing a thickening substance in the form of a plastisol with a printing ink to define a modified ink formulation, installing said sleeve on said support means, and reverse flowing said ink formulation through said ink-applying surface toward said axis to substantially fill said integral ink-receiving cavities and passages, said thickening substance serving the dual purpose of increasing the kinematic viscosity and tackiness of said ink formulation and thereby enabling said roll to be used at comparatively high rotational speed free of misting.

12. A method as set forth in claim 11 and comprising the further step of subjecting said roll with said modified ink formulation disposed in its sleeve to an elevated temperature to further increase the kinematic viscosity of the ink formulation.

13. A method as set forth in claim 11 and further comprising adding a reducing oil to said ink formulation during said mixing step to precisely control the viscosity of said ink formulation.

* * * * *